United States Patent [19]
Sullivan et al.

[11] 3,752,339
[45] Aug. 14, 1973

[54] CARGO HANDLING SYSTEM AND METHOD

[75] Inventors: Norman M. Sullivan; Francis J. Fitzgerald, Jr., both of Grand Rapids, Mich.

[73] Assignee: Rapistan Incorporated, Grand Rapids, Mich.

[22] Filed: July 2, 1970

[21] Appl. No.: 60,970

Related U.S. Application Data
[62] Division of Ser. No. 703,514, Jan. 23, 1968, Pat. No. 3,592,333.

[52] U.S. Cl. .............................................. 214/152
[51] Int. Cl. ..................................................... B65g
[58] Field of Search................... 214/152, 16.1 CB, 214/16.1 CF

[56] References Cited
UNITED STATES PATENTS
1,969,002  8/1934  Gleichman................... 214/16.1 CF
2,923,421  2/1960  DeRoumefart............... 214/16.1 CB Primary Examiner—Richard E. Aegerter
Attorney—Price, Heneveld, Huizenga & Cooper

[57] ABSTRACT

A method of conveying articles from one location to another on a series of modular conveyor units having self-contained load-driving means. A plurality of individual conveyor modules are controlled from a central control unit such that the articles are automatically transferred according to a predetermined program on a series of related preferred modules until the desired location is reached. In the event a module is occupied by another article, the method includes the step of determining an alternate route to convey the articles to the desired location.

2 Claims, 24 Drawing Figures

LEGEND
☒ VERTICALLY SHIFTABLE MODULE
▦ QUEUING MODULE
☐ TRANSPORT MODULE

Patented Aug. 14, 1973

INVENTORS
NORMAN M. SULLIVAN
FRANCIS J. FITZGERALD JR.
BY
ATTORNEYS

Patented Aug. 14, 1973 3,752,339

INVENTORS
NORMAN M. SULLIVAN
FRANCIS J. FITZGERALD JR.
BY
ATTORNEYS

Patented Aug. 14, 1973

INVENTORS
NORMAN M. SULLIVAN
FRANCIS J. FITZGERALD JR.
BY
Price, Heneveld
Huizenga & Cooper
ATTORNEYS

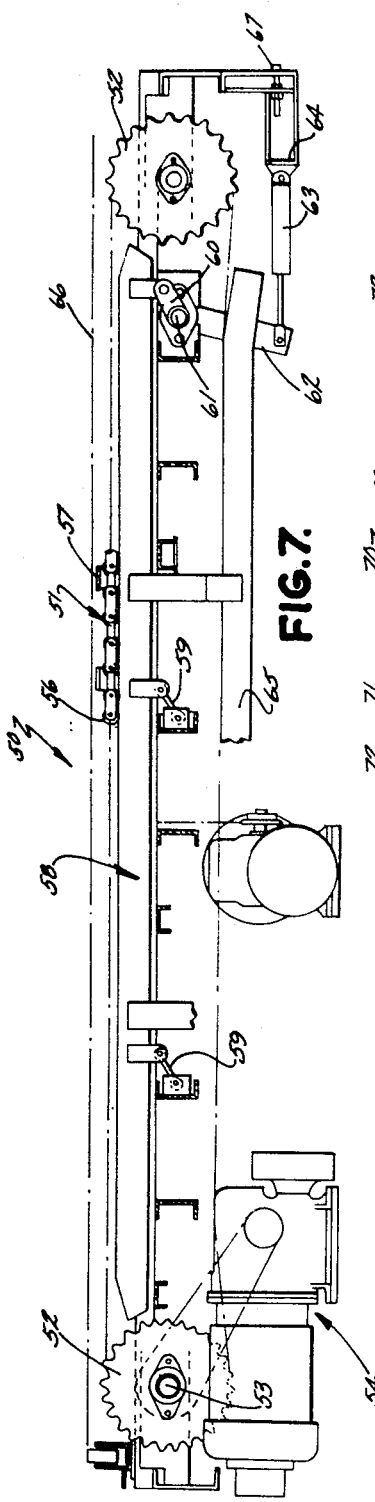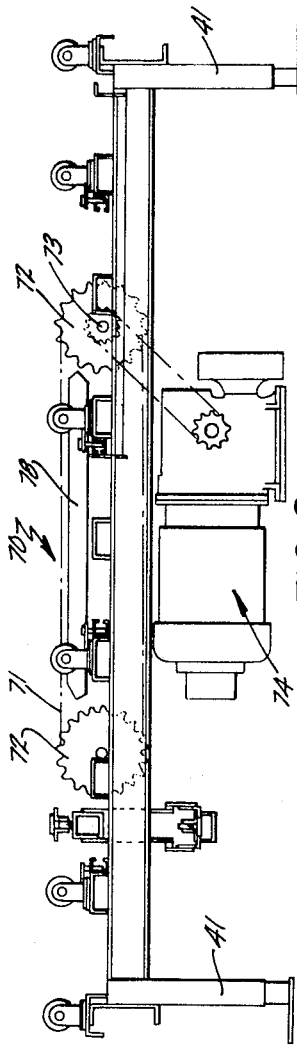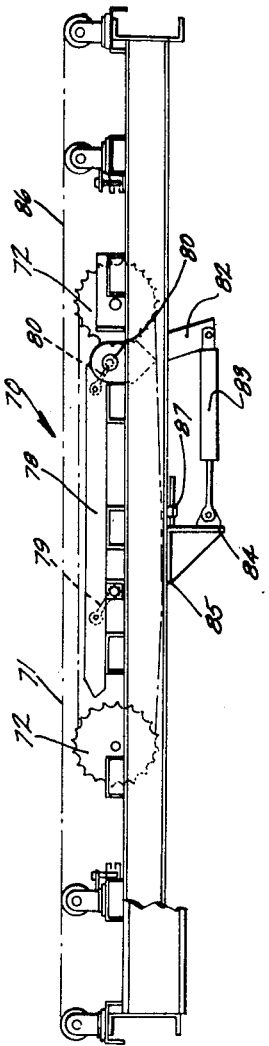

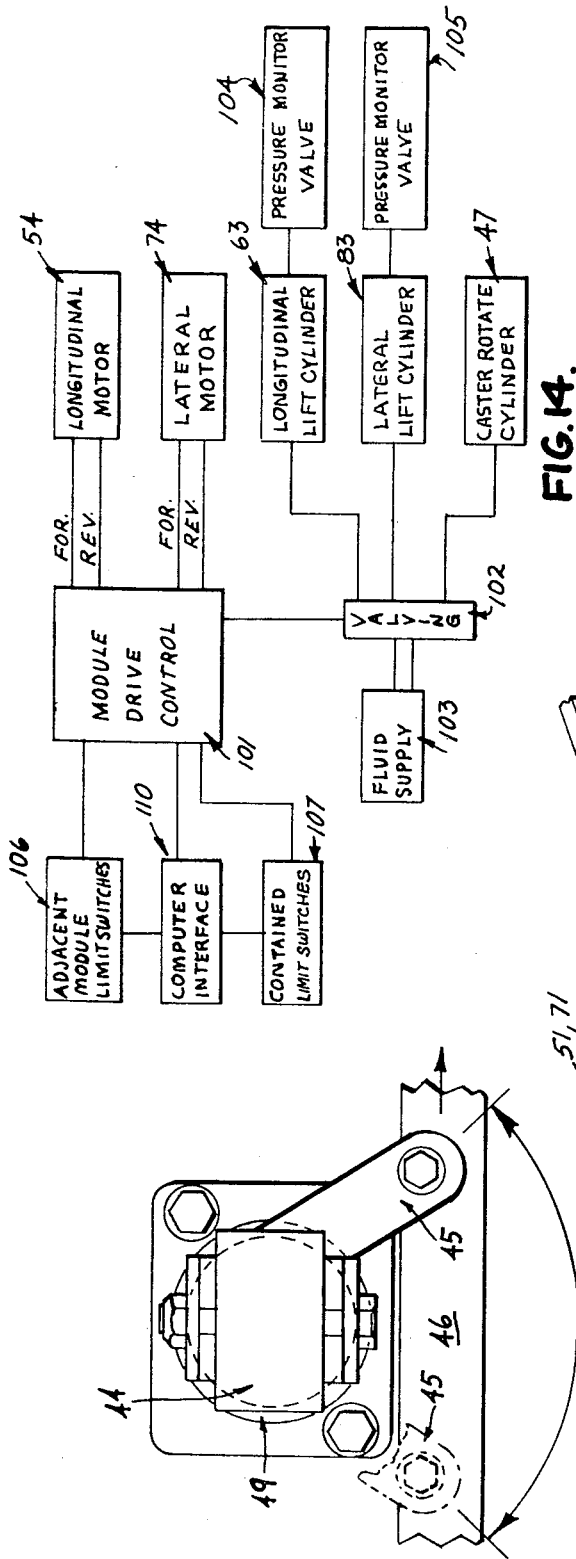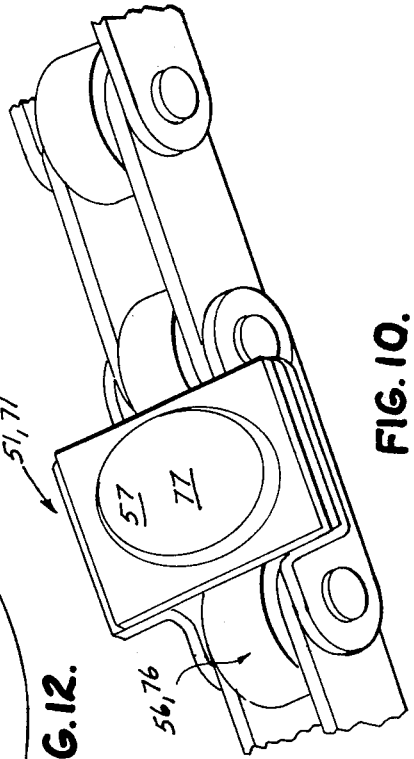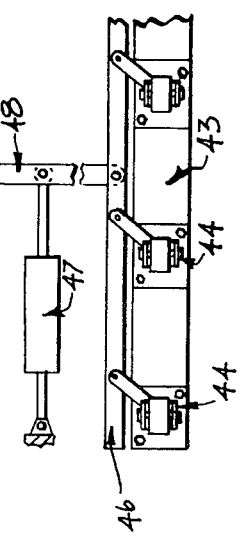

Patented Aug. 14, 1973
3,752,339
12 Sheets-Sheet 10
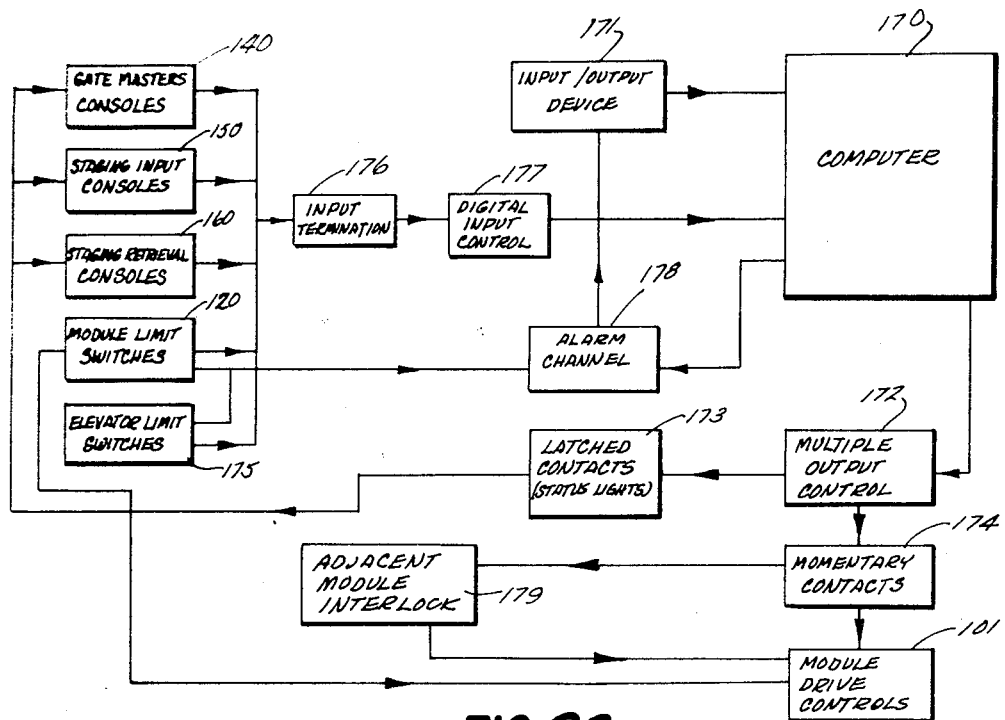
FIG. 22.
FIG. 23
FIG. 16.
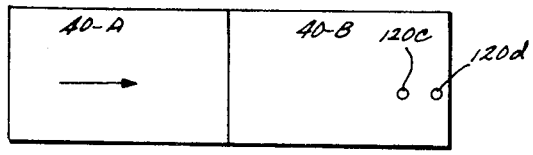
INVENTORS
NORMAN M. SULLIVAN
FRANCIS J. FITZGERALD JR.
ATTORNEYS Patented Aug. 14, 1973

INVENTORS
NORMAN M. SULLIVAN.
FRANCIS J. FITZGERALD JR.
BY Price, Heneveld
Huizenga & Cooper
ATTORNEYS Patented Aug. 14, 1973

INVENTORS
NORMAN M. SULLIVAN
FRANCIS J. FITZGERALD JR
BY
ATTORNEYS

CARGO HANDLING SYSTEM AND METHOD

This application is a divisional of U.S. Pat. application Ser. No. 703,514 filed Jan. 23, 1968, now U.S. Pat. No. 3,592,333 issued July 13, 1971, entitled CARGO-HANDLING SYSTEM AND METHOD.

This invention, while useful in a number of applications, is particularly applicable to the handling of a palletized cargo at freight terminals. Originally, freight cargos were handled manually with individual items loaded, unloaded, stored, classified, and moved individually. As the volume of freight and the cost of direct labor increased, conveyors were introduced and in many cases, complex and sophisticated systems evolved. These systems, however, were generally limited to the mechanical handling of individual items and the collecting of them at central points for loading onto pallets. The handling of the loaded pallets was simply by movement along conventional conveyors.

These systems, while employing many standard conveyor components such as curves, switches, transfer tables, and roller bed conveyors, are carefully engineered systems with each system custom designed from the ground up. Further, these systems are static, inasmuch as once installed, they are not capable of modification without substantial re-engineering and the purchase of many additional, custom manufactured components. These systems also require a high degree of uniformity of size and shape of the pallets. As cargos have become more varied, with some of the articles much too big to be handled on the older type of pallets, these systems have proved inadequate.

Systems of the type described require, in addition to the capability of transporting an article from one location to another, storage areas where the pallets or other types of loads may be stored prior to their being loaded onto the aircraft or, alternatively, subsequent to their removal from the aircraft and, yet, prior to an opportunity to dispose of them. The ability of a system to store effectively and efficiently cargos of these types, providing for quick identification and access to them for loading or unloading, has long been recognized as a primary operative criterion in the field. Systems previously available have not effectively fulfilled this requirement. More particularly, the article transfer methods of prior art concepts have required the storage capabilities of the system, particularly as regards the functions of identification and retrieval, be compromised to a point greatly detracting from the overall capabilities of the system.

Another facet limiting the overall effectiveness of the prior art systems is a product of the limitations of space and required man power. The available area upon which such facilities are constructed is generally highly limited, particularly in the case of air cargo installations, and it is imperative that any cargo handling system be retained in as compact form as possible. Problems in procurement and compensation of workers, likewise, limit the number of employees which may be utilized in any given operation in order to retain turn around times for aircraft, trucks and the like to a minimum. Man power and space dictates, thus, have resulted in a marked compromise of overall operating efficiency in the systems available previous to the instant invention.

Consider, for example, a large jet freightliner, an item representing a considerable investment for the particular airline company involved. It is axiomatic, virtually, that the greater the percentage of the time such an aircraft spends in the air actually flying freight from one location to another, the greater will be the financial return on the investment. A corollary to this statement, of course, is that the longer the time elapse during the landing, unloading, reloading and departure of an aircraft, the less efficient the operation from a monitary standpoint. These statements hold true, additionally, regardless of the type of vehicle which is involved in the particular operation.

In the past years, the volume of freight handled by operations of the type described has and continues to increase markedly. As a result of this increase, the demand has been generated for freight handling concepts and hardware beyond the technology of the present art. An eye toward the future demands that installations should be capable of expansion and/or reorganization in order to accommodate new types of freight, increased volumes of freight and the like. Systems currently available, as noted previously, are generally composed of highly specialized, job-engineered components which have little value apart from the system in which they were designed to function. For example, present-day components are limited to highly specialized functions within the system such as turning, linear movement or the like. Any attempt to reorganize these components or to expand the system while utilizing them represents an extremely difficult, if not impossible, undertaking.

It is an object of this invention, therefore, to provide a novel concept of freight handling, storage, loading, unloading and the like which is keyed to present-day and anticipated future demands of transportation concerns. This invention contemplates, thus, the provision of specific representative hardware which has been evolved by the inventors for utilization in the execution of their concepts.

It is an object of this invention to provide such a system wherein freight transfer, storage and the like is executed virtually automatically, manpower requirements being minimized.

It is another object of this invention to provide a system of the type described which is capable of handling high volumes of freight in areas of limited space and, thus, which is feasible for utilization at airfreight terminals, downtown truck terminals and the like where space is always a premium factor in the selection of any type of equipment.

It is an object of this invention, additionally, to provide a novel method of accelerating and decelerating loads during the transfer thereof from module to module from one location to another within the system.

It is still a further object of this invention to provide a novel control concept for a system of the type described which minimizes manpower requirements while markedly increasing the speed, efficiency and other capabilities of the system. The fulfillment of this objective involves, inter alia, the provision of a preprogrammed computer adapted to route loads through the system via preferred and alternate paths, the latter paths being utilized in the event that the preferred path is busy.

It is an object of this invention, thus, to provide a novel method of handling freight within terminals, processing facilities and the like.

These as well as other objects of this invention will be readily understood with reference to the following specification and accompanying figures in which:

FIG. 7 is a cross-sectional view taken along plane VII—VII of FIG. 6;

FIG. 8 is a cross-sectional view taken along plane VIII—VIII of FIG. 6;

FIG. 9 is a cross-sectional view taken along plane IX—IX of FIG. 6;

FIG. 10 is a fragmentary, perspective view of a suitable drive chain;

FIG. 11 is a fragmentary, plan view of the castor rotating mechanism;

FIG. 12 is a plan view of an individual castor or support wheel illustrating its mode of rotation;

FIG. 14 is a block diagram of a typical self-contained module control unit illustrating, additionally, its connections to the control system and to the sensing elements on adjacent modules;

FIG. 16 is a schematic illustration of the braking sequence during load transfer from one module to an adjacent module;

FIG. 22 is a block diagram of the control system;

FIG. 23 is a schematic representation of a group of 11 illustrative modules.

Briefly, this invention comprises the manner in which the individual modules are controlled from a central control unit such that articles will be automatically transferred according to a predetermined program from any position in the system to any other position in the system on command. In addition to supervising the actual transfer of the loads, the computer or computer-like control system also retains the instantaneous position of any module within the system in relation to the module identification number and, therefore, accelerates location and recall time of a particular load.

Figure 1:
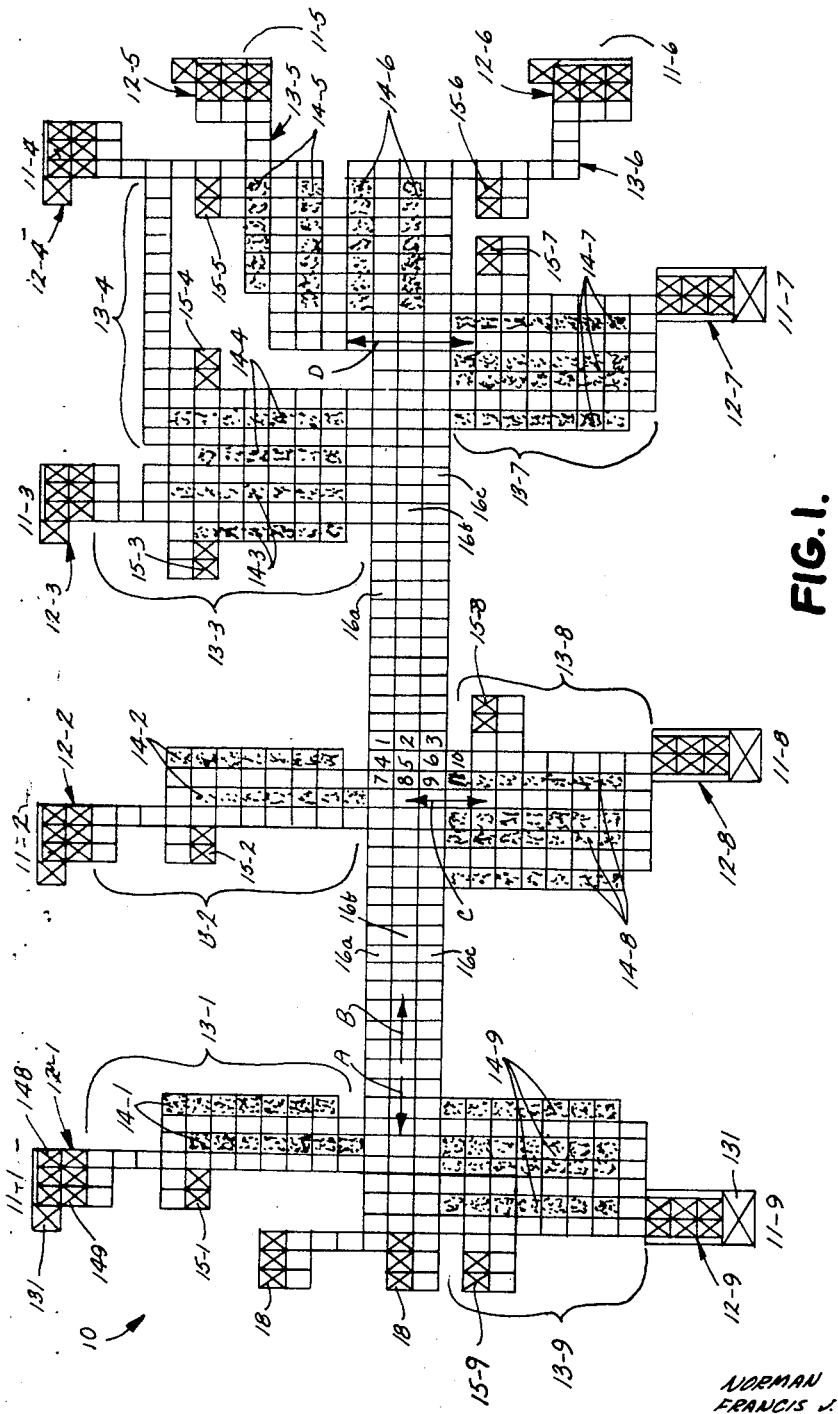
FIG. 1 is a schematic illustration of a typical upper-level system adapted for utilization in the handling of airfreight cargo.
Figure 2:
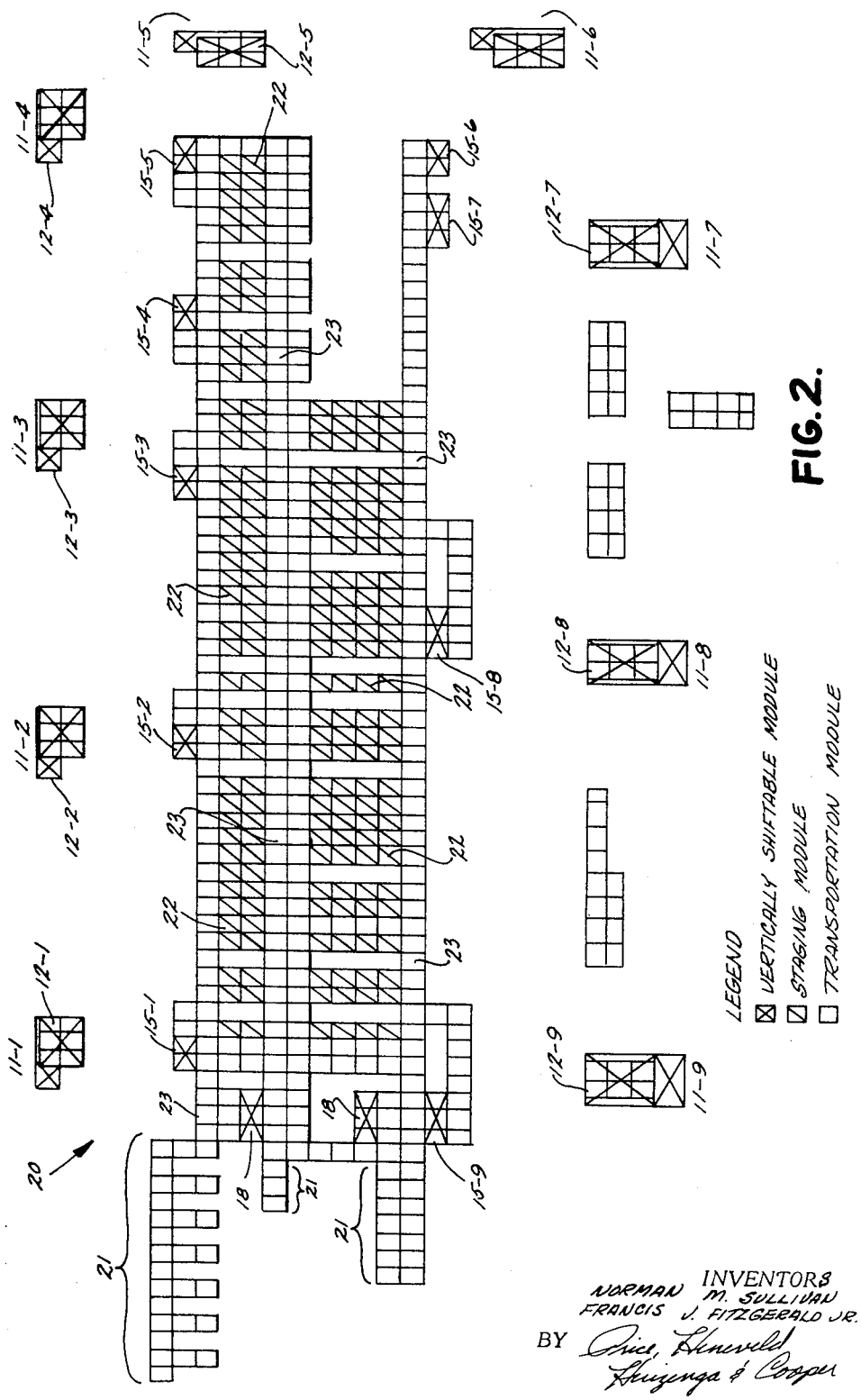
FIG. 2 is a schematic illustration of a lower-level system suitable for utilization in conjunction with the upper-level system illustrated in FIG. 1.

FIGS. 1 and 2 illustrate schematically the upper and lower levels, respectively, of an illustrative air freight terminal constructed in accordance with the teachings of this invention. Referring initially to FIGS. 1, the upper level schematic, the enclosing structure (not shown) is positioned on the air field in such a manner to provide a series of aircraft parking aprons, 11-1 through 11-9, about its perimeter. Each of the parking aprons has associated therewith an aircraft loading and unloading station, 12-1 through 12-9, which is connected by spur conveyor assemblies, 13-1 through 13-9, to the main upper-level conveyor system 16. Each of the spur assemblies and the main conveyor assembly may have one or more conveyor lanes, as further described hereinafter.

Each of the loading and unloading stations 12-1 through 12-9 is provided with its own queuing area, 14-1 through 14-9, respectively within which the particular freight assigned for loading onto a specified aricraft is positioned ans stored until such time as that aircraft is ready for loading. Also positioned adjacent each of the loading and unloading stations is a vertical lift, 15-1 through 15-9, upon which freight is positioned for lowering to the lower-level system shown in FIG. 2, the lifts being indicated by like reference numerals in FIG. 2. Freight is introduced into the upper-level system 10 by means of vertical lifts 18 which empty onto the main conveyor 16.

As noted in the introduction to this application, the system which is the subject of this invention is comprised of a rather large number of independent modules, each of which modules is indicated schematically by one of the rectangles in FIGS. 1 and 2. In these figures, legends have been provided indicating (1) those which are vertically shiftable; (2) those utilized for queuing freight pallets prior to their loading onto a particular aircraft; (3) those utilized basically as transportation modules; and (4) those utilized as staging modules on the lower level. The vertically shiftable modules are identical to the other modules within the system (aside from certain drive capabilities to be discussed in detail hereinafter) but are mounted on elevators or hoists such as of the scissor variety in order to permit them to be shifted from floor to floor, aligned with the sill height of a particular aircraft or the like. The vertically shiftable modules positioned at the aircraft loading and unloading stations 12-1 through 12-9, thus, are utilized to match the unloading sill height of the particular aircraft and to thereafter elevate the freight being unloaded onto the upper level system. In loading, similarly, these vertically shiftable modules are utilized to bring the freight down to the sill height of the particular aircraft being loaded.

The main conveyor assembly 16, running basically lengthwise of the upper system, is primarily a transportation and/or accumulation unit and consists, in this particular schematic showing, of three lanes, individually designated by the numerals 16a, 16b and 16c. The lanes are positioned in side-by-side relationship with respect to one another, each lane being the width of one of the modules to be discussed in detail hereinafter. With such arrangement, each lane may operate independently of each of the adjacent lanes or, if desirable, two or more of the lanes may be combined to operate simultaneously for the transportation of a single article. The arrows A and B in FIG. 1 indicate that the lanes 16a, 16b and 16c may be utilized to transport articles in either direction lengthwise of the main conveyor 16. The arrow C indicates that the individual modules may be utilized to transfer an article to or from any one of the spur conveyors 13 to any selected lane or lanes of the main conveyor 16, the article having been once transferred onto one or more lanes of the main conveyor 16 being thereafter transferrable in either direction along the main conveyor. Arrow D indicates that the modules may be utilized to transfer an article from one spur conveyor to another across the main transport conveyor 16 as, for example, spur conveyor 13-5 to 13-6. Additionally, of course, the pallets or other articles may be transferred from one lane to another and their direction of movement changed within the main conveyor assembly 16.

In ordinary circumstances, most if not all of the freight arriving on a particular aircraft will be prepacked on pallets, the size and shape of which may vary greatly depending upon the particular aircraft and the designated fuselage location thereof. As an aircraft is unloaded at one of the gates 11, the gate master, in a manner to be discussed in detail hereinafter, will direct specific pallets to (1) the queuing area at the same gate for thru freight; (2) one of the elevators 15 for removal to the lower level either for breakdown or storing in the staging area; or (3) to the queuing area of another gate in the case of an on-line transfer. Pallets are introduced into the upper level via the elevators 18 from the lower level system.

Referring now additionally to FIG. 2, there is illustrated schematically a typical lower-level system 20 for utilization below the structure illustrated in FIG. 1. This lower-level is merely illustrative of a virtually infinite variety of systems which could be utilized in conjunction with the system shown in FIG. 1 and, for that matter, on the same vertical level as the system shown in FIG. 1, the double-decker nature of the system being necessitated only by a desire to conserve space, reduce traveling distances and the like which factors might not be present in other applications.

The lower level system 20 has input and discharge area 21 which are accessible by truck or other type of ground transportation. At the locations 21, the pallets are placed into and removed from the system. These areas may be expanded, if desirable, to provide facilities for packing and breaking down the pallets as well as introducing them into and removing them from the system.

The lower level 20 is divided into a series of staging areas, indicated generally by the reference numeral 22, having an intrastaging area transport conveyor system 23 running therethrough in any convenient pattern. Both the staging area and intrastaging area transport conveyor system are formed from modular conveyor units generally identical to those discussed in connection with the upper level system and to be described in detail hereinafter. Each of the rectangles in FIG. 2, thus, represents an individual module and those modules 15 and 18 which communicate between the upper and lower levels of the system by means of vertical hoists or the like are illustrated in both diagrams.

The major portion of the lower level is utilized as a staging area into which pallets are placed for storage either (1) prior to the time they are lifted to the upper level for transport to a predetermined queuing area; or (2) prior to the time it is desired to either break them down into individual articles or transfer them onto an appropriate vehicle for removal from the facility. The lower level functions, additionally, as a reception area for freight discharged either into the staging area or the outgoing area from the elevators 15-1 through 15-9 which receive terminating or staging freight during the aircraft unloading process. Individual pallets are assigned a particular storage location upon arrival into the system by staging input personnel and are removed from the system for transfer to the upper level or breakdown area by the staging retrieval personnel. Each of these functions will be discussed in detail hereinafter.

Figure 3:
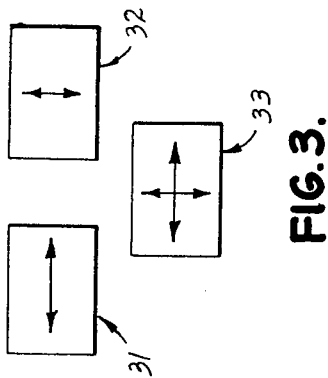
FIG. 3 is a schematic illustration of the module directional capabilities.

FIG. 3 illustrates schematically the directional drive capabilities of the various conveyor modules utilized throughout the system. As illustrated, module type 31 possesses a drive capability both forward and reverse in its longitudinal direction. Module 32 is capable of driving loads in either of its lateral directions while module 33 is capable of driving loads in any of four directions along its longitudinal and lateral axes. The drive capabilities of each of the modules, as will become apparent hereinafter, is preferably a function only of the amount and type of drive equipment installed on any single basic module. It would be possible, of course, to construct the entire system of four-way modules such as that illustrated by the reference numeral 33 in FIG. 3, but such a construction would represent an unnecessary investment in materials and labor since many of the modules in the system, due to their position with respect to other modules, will never be called upon to move loads in both directions along both the lateral and longitudinal axes thereof. Referring briefly back to FIG. 2, for example, those modules connecting the vertical lifts 15-6 and 15-7 with the remainder of the staging area would under no circumstances ever be called upon to operate in a longitudinal mode since there are no modules at the ends thereof to receive goods shifted therefrom. It is obvious, therefore, that economic demands dictate the utilization of lateral, longitudinal and four-way modules within the system. It will be obvious, further, from an examination of the schematics shown in FIG. 3 and the ensuing description of a representative module that it may be desirable to fabricate modules capable, for example, of pallet movements in both directions along the longitudinal axis and, yet, in only one direction along the lateral axis. It might be desirable, additionally, to fabricate the modules in square formation rather than rectangular in which case use redundancy within the system could be increased. Each of these details must depend upon the particular classes of installation for which the modules are being designed.

Figure 4:
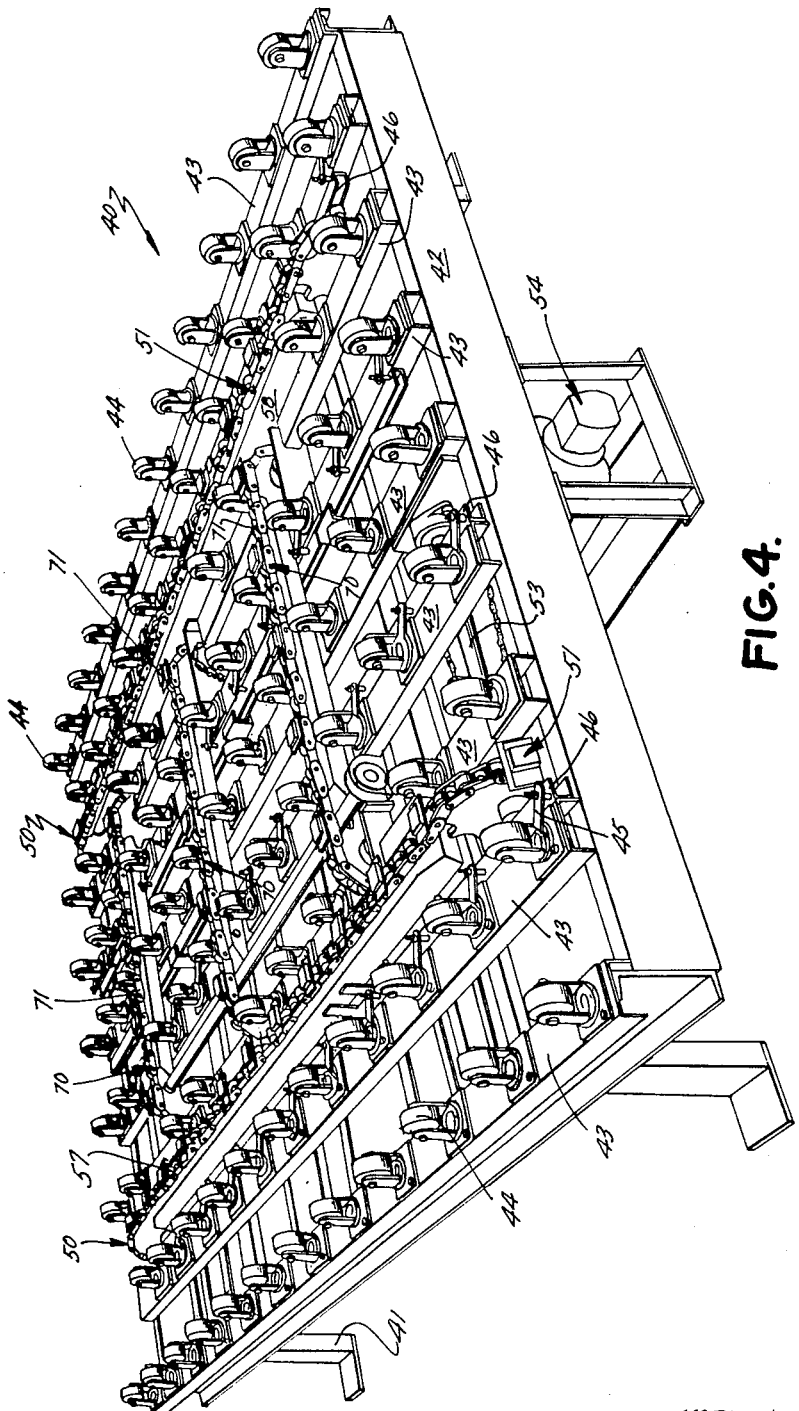
FIG. 4 is a perspective view of a typical four-way module.
Figure 5:
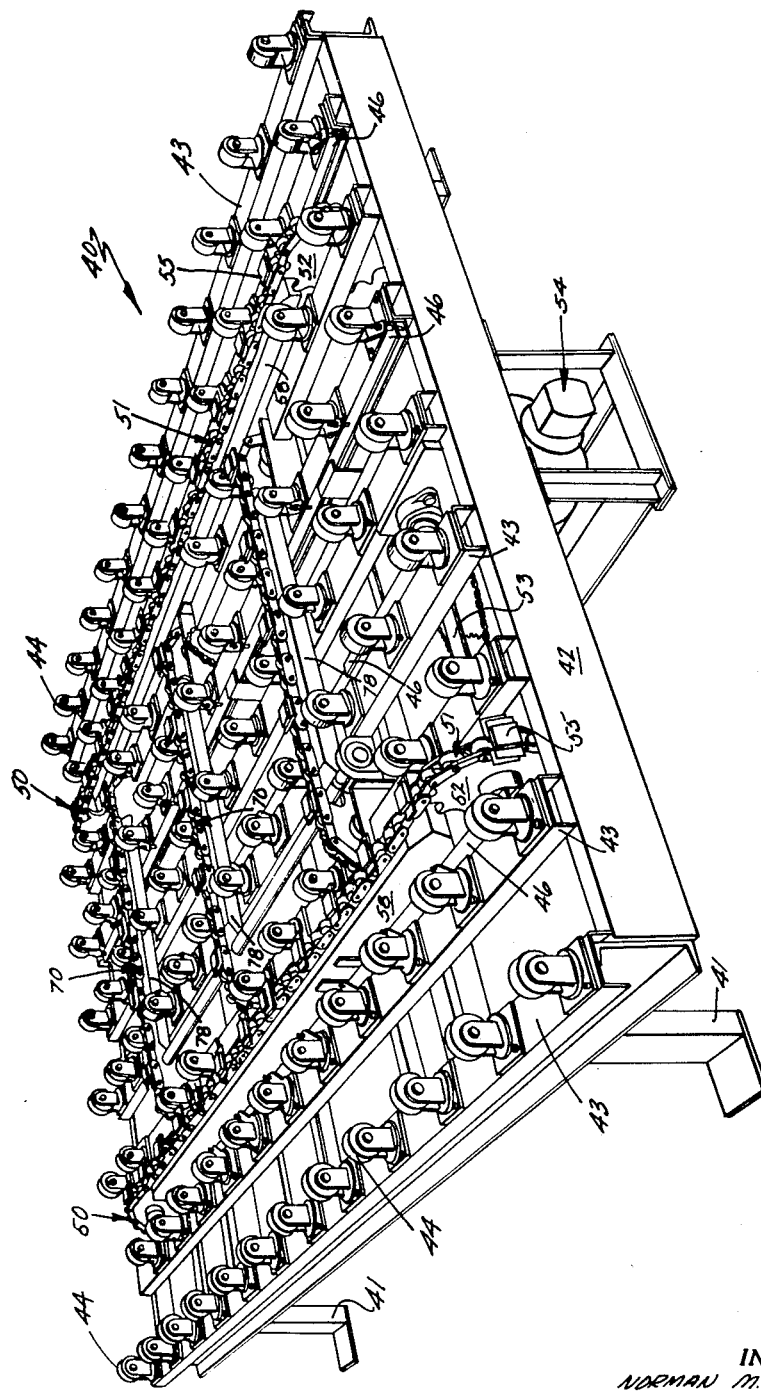
FIG. 5 is a perspective view of the module illustrated in FIG. 4 subsequent to rotation of the castors for movement of a load in a different direction.
Figure 6:
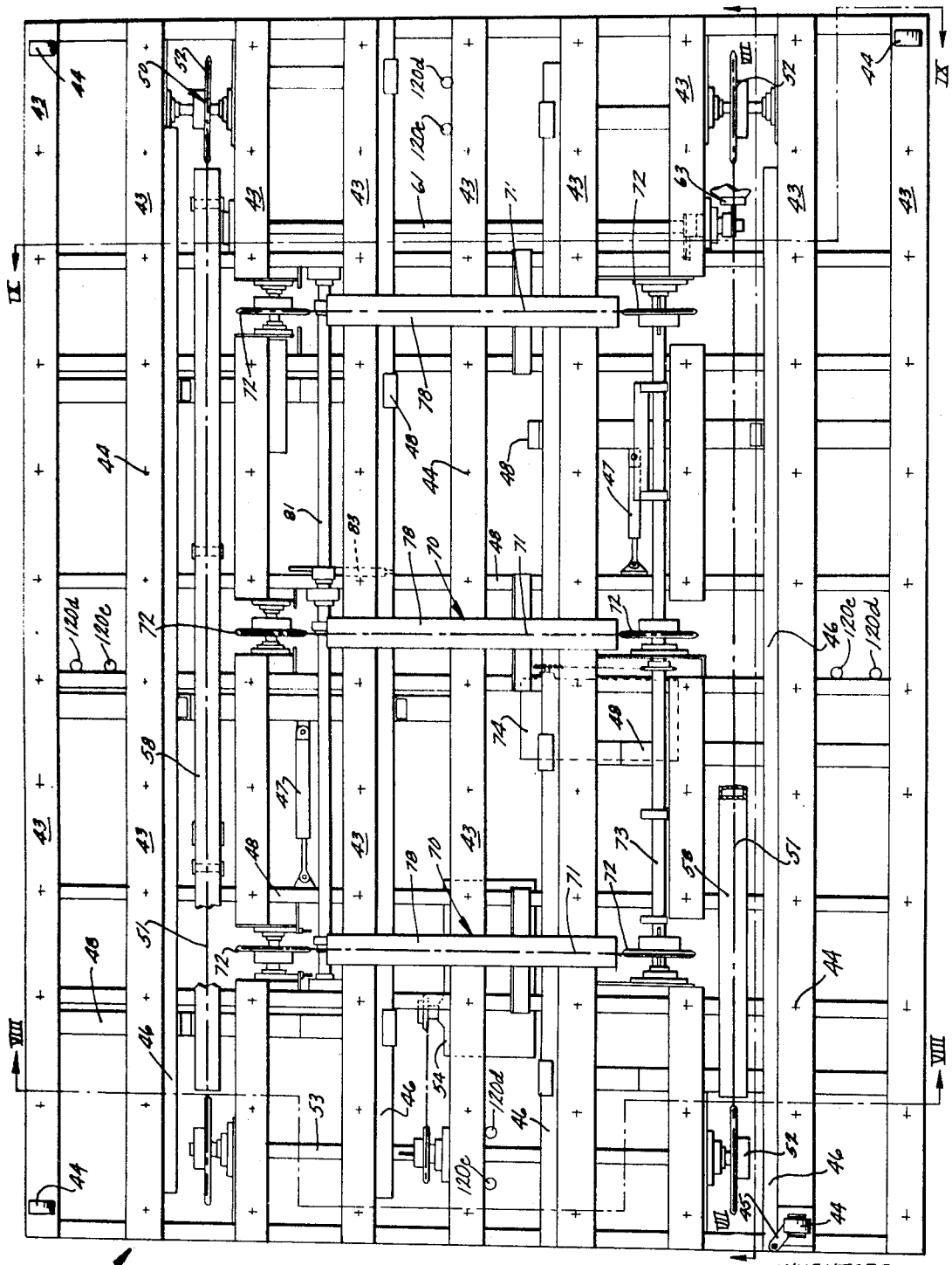
FIG. 6 is a plan view of the module shown in FIGS. 4 and 5.

FIGS. 4 through 12 illustrate the details of a typical module suitable for utilization in the systems illustrated schematically in FIGS. 1 and 2. Referring initially to FIGS. 4 through 6, the representative module 40 comprises a series of upright supports 41 which suspend a conveyor bed 42 in elevated position with respect to the surface upon which it is resting. The bed 42 is formed from structural steel or the like in conventional fashion. Across bed 42 are affixed a series of longitudinal supports 43 upon which are affixed a series of rotatable castors or pivotable conveyor wheels 44 in grid-like fashion. Merely by way of example, castors embodying a three inch diameter, roller bearing, grease packed wheel mounted on 12-inch centers will provide sufficient support for typical aircraft loads palletized on hard bottomed members. The individual castors, as shown in FIG. 12, are mounted on rotatable bases 49. The castors in every other row are provided with rotating levers 45 extending therefrom. The rotating levers 45 are interconnected by a series of lever tie rods 46 in pivotable fashion. The tie rods 46 run generally parallel to the longitudinal supports 43 on the conveyor bed 42. The lever tie rods, in turn, are slaved for movement together by a series of cross members 48 (see FIG. 11), which cross members are forced back and forth in directions parallel to the longitudinal supports 43 by means of hydraulic actuating cylinders which, preferably, are of the compressed air variety. Depending upon the positioning of the support structure, drive mechanisms and the like on the conveyor bed 42, it will be necessary to provide multiple cross members 48 through the system. It will be necessary, additionally, in all probability, to break some of the elongated lever tie rods 46 intermittently along the length of the module in order to permit their clearance of the drive mechanisms. In the embodiment illustrated, it was found convenient to utilize two separate air cylinders 47, one on either side of the machine, interconnected with the lever tie rods 46 by means of multiple cross-length members 48.

Referring now specifically to FIGS. 4, 5, 11 and 12, it will be noted that when the air cylinders 47 are actuated in a particular direction, longitudinal thrust is exerted on each of the lever tie rods 46 by the cross linkage 48. This causes the tie rods 46 to swing out in arcuate manner from the longitudinal supports 43 and then back into abutment therewith. The longitudinal motion of the tie rods 46 is transmitted to the rotatable castors 44 via the castor rotating levers 45 and the castors rotate 90° from, for example, the position shown in FIG. 4 to the position shown in FIG. 5. If thrust is thereafter exerted on the tie rods 46 by the actuating cylinders 47 in an opposite direction, the castors will rotate back to their original position in identical fashion.

Castors of the type illustrated are adapted particularly for utilization in the system since they make line, rather than point, contact with the undersurface of the pallet or other load which is positioned upon the module. The rather large contact area prevents indentation of the pallet undersurface by the supporting members and, thus, markedly reduces the force required to initiate movement of a load after it has been setting upon the module for a substantial period of time. The contact, on the other hand, is not so great as to require a large rotating force, when it is desired to change the position of the directional supports with respect to the conveyor bed 42 and, thus, they may be rotated through utilization of one or two relatively inexpensive air cylinders.

In most situations, it will not be necessary to forcibly rotate all of the castors on a given module, but rather sufficient directional capabilities may be obtained by merely rotating every other line of them as illustrated in FIGS. 4 through 6. Those castors not so slaved together, it has been found, will rotate under the influence of the movement load to permit unimpeded movement of the pallet in any direction with respect to the module. If necessary, however, all of the castors on a given module may be slaved for rotation together by merely extending the tie rod, cross member complex shown in FIG. 11.

Referring now to FIG. 7, the longitudinal pallet drive assembly 50 comprises a pair of spaced, endless chains 51 suitably borne in rotatable fashion by sprockets 52. Two of the sprockets 52 are connected by means of a power transmission shaft 53, suitably journaled on the bed 42, and the shaft is chain powered from a motor and right angle drive assembly 54. The motor 54 is reversible and, additionally, is capable of decelerating and braking as well as accelerating the load as will be discussed in detail hereafter. the chain 51 incorporates a plurality of rollers 56 and spaced pads 57 adapted to grip the undersurface of the pallet. The pads 57, thus, should be fabricated from a material having a high friction coefficient such as is found in many synthetic rubber or plastic materials currently on the market.

The chain 51 is raised into pallet engaging position by means of lift shoes 58. The shoe 58, as shown best in FIG. 7, is connected to the bed 42 by means of two sets of idler linkage 59 and lift linkage 60. Lift linkage 60 is rotatably powered by means of an elongated shaft 61, connecting the two shoes 58, and shaft 61 is rotated by means of a crank 62 non-rotatably affixed thereto. The crank 62 is actuated by means of an air cylinder 63 suitably mounted to the bed of the conveyor as indicated at 64. The lower run of the chain 51 is supported within a suitable chain return track 65.

In FIG. 7, line 66 represents the height of the castor rollers 44 and it will be noted that the shoe 58 ordinarily holds chain 51 in such a position that the pads 57 are below this level. The drive chain assembly 50, thus, does not contact the lower surface of the pallet continuously. It is selectively brought into contact with the pallet, rather, by the energization of the cylinder 63 which shifts crank 62 rotating rod 61. The rotation of rod 61, in turn, causes pivot linkage 60 and idler linkage 59 to pivot shoe 58 in parallelogram-like fashion upwardly until pads 57 come into contact with the lower surface of the pallet or other article being conveyed. Conveniently, air cylinder 63 may incorporate a pressure monitor valve which will permit the cylinder 63 to be self-adjusting insofar as regards the amount of pressure placed upon the lower surface of the pallet.

When proper frictional contact with the undersurface of the pallet has been achieved, the motor 54 is activated and the load moved across the castors 44 onto the succeeding module in the desired direction. In this regard, it should be noted that the embodiment illustrated in this specification renders it possible to move the load across the module 40 without necessitating the lifting of it by the drive mechanism. Primary load weight, rather, remains on the castors and, thus, the load can be moved without the necessity of vertically altering its position.

Another salient feature of the novel module lies in the free-wheeling characteristics thereof when no mechanical driving force is being applied to the load thereon. The load, thus, may be manually manipulated upon the castors 44 from module to module in the event of a driven failure to permit emergency loading and unloading of aircraft even absent power to the system. In the event that the drive chain 51 is in its raised position during such failure, and does not drop away by itself, a bleed valve may be incorporated in cylinder 63 which, when manually activated, will cause shoes 58 to drop.

It will be readily appreciated that the relatively wide spacing of the longitudinal pallet drive assemblies 50 from each other require that the load supporting bed 42 of the unit not be much larger than the dimensions of the pallet, to insure that the pallet is properly engaged by the drive. Preferably, the bed size is approximately the same size as the pallets used on the bed. The need for this limitation will become further apparent when the limit switches used in each module are discussed hereinafter.

The lateral pallet drive assembly 70, illustrated in FIGS. 8 and 9, is virtually identical to the longitudinal pallet drive assembly 50. As shown best in FIG. 6, three of the lateral drive assemblies are positioned on the conveyor bed 42 between the spaced longitudinal drive assemblies 50. The lateral pallet drive assemblies comprise drive chains 71 rotatably borne in endless fashion on sprockets 72. The three drive sprockets 72 are interconnected by a power transmission shaft 73 actuated via motor and right angle drive assembly 74. Again, as was the case with longitudinal drive motor 54, the motor 74 is reversible ordinarily and incorporates means for decelerating and braking as well as accelerating the load. These details depend, of course, upon the desired directional capabilities of the module.

The chain 71 is identical to the chain 51 discussed previously and includes rollers 76 and pads 77. The lift shoes 78 are supported at one extremity by an idler link 79 and at the opposite extremity by a lift link 80. A shaft 81 is connected to each of the lift links 80 and power transmitted to the shaft by means of a lever arm 82 selectively actuated by an air cylinder 83. Air cylinder 83 is affixed to the bed of the conveyor 42 as indicated at 84 and a return track 85 is provided for each of the drive chains.

In a manner identical to that discussed in connection with the longitudinal drive assembly 50, actuation of the air cylinder 83 causes the shoes 78 to pivot in parallelogram-like fashion upwardly with respect to the conveyor bed 42 pushing the pads 77 above the castor support height 86 and into engagement with the load resting thereon. Again, preferably, a pressure monitor valve, to be discussed hereinafter, is provided for cylinder 83 such that the constant pressure will be exerted upon the pallet regardless of minor wear and tear on the apparatus. Once the shoe 78 has brought the lateral drive chains 71 into contact with the load, the motor 74 is actuated in the desired direction and the load driven from the module. Air cylinder 83 is then returned to its initial position to drop the drive chain 71 below castor level 86. The module 40, thus, thereafter is again free wheeling permitting manual movement of loads in the event of a failure in the system. In the event the failure should cause the drive chain 71 to remain in their elevated position, a manual bleed valve is provided on cylinder 83 for manually dropping them out of engagement with the pallet.

The representative module which has been described in connection with FIGS. 4 through 12 is, of course, of the four-way type. That is to say that by using reversible motors, it is capable of shifting a load from and receiving a load on the pallet in any of four perpendicular directions. The load is shifted longitudinally by means of drive chains 51 and motor 54 rotating in the desired direction. The load is shifted laterally by means of drive chains 71 and motor 74 operating in the desired direction.

In many instances, it may not be either necessary to desirable to provide this "universal" or four-way type of movement capability on particular pallets. In these situations, while the same basic module is utilized, specified drive assemblies may be omitted completely and the castors 44 fixed in permanent position. It may be possible, additionally, to raise the drive chains 51 and 71 permanently above the plane of the castor supporting surface, 66 and 86, and also omit the lifting mechanism for the particular drive assembly remaining on the apparatus. In the latter case, however, much of the mobility of the system is lost since it is no longer free-wheeling and a load can no longer be manipulated thereover by hand. Much of this disadvantage can be overcome by providing some sort of manual release means for lowering the bidirectional drive chains in this particular situation.

Figure 13:
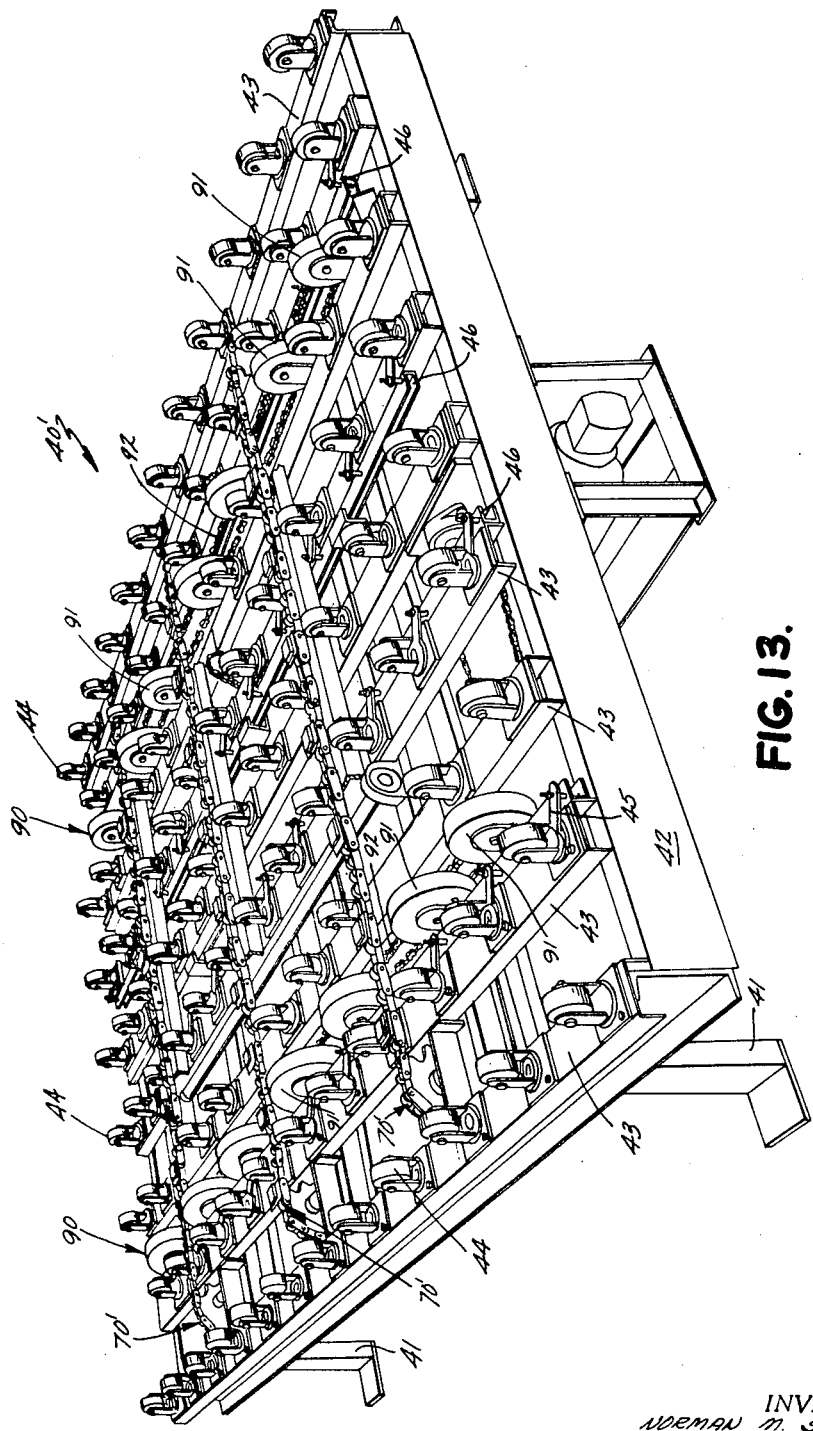
FIG. 13 is a perspective view of a modified module.
Figure 24:
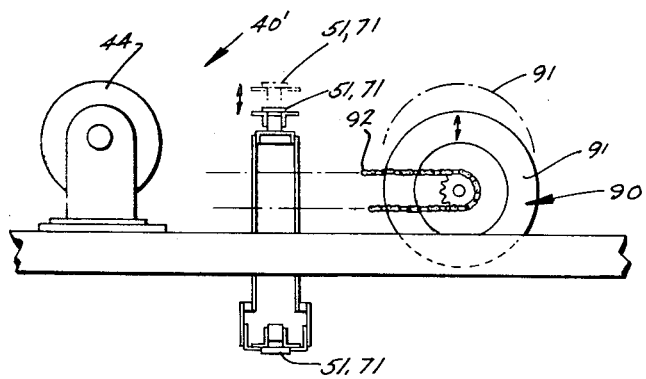
FIG. 24 is a schematic illustration of the drive mechanism interfit in the modified module of FIG. 13.

FIGS. 13 and 24 illustrate a modified embodiment of a four-way type of module 40' wherein the lateral or longitudinal drive assembly has been replaced by a modified form of drive assembly indicated generally by the reference numeral 90. The modified drive assembly 90 comprises two series of aligned rollers or wheels 91 suitably journaled upon a rail (not shown) which, for example, might resemble lift shoe 58 in FIG. 7. The rollers are rotated by means of drive chains 92 in conventional fashion and the entire drive assembly, preferably, is constructed so as to raise above or drop below the plane of the castor supporting surface in exactly the same fashion as the pads 57 in FIG. 7. Thus, if the rollers are rotatably borne upon a rail similar to shoe 58 in FIG. 7, a lifting mechanism virtually identical to that shown in FIG. 7 may be utilized to lift their peripheries into and out of contact with the lower surface of the pallet or other article positioned upon the conveyor module. Rotatable thrust of a reversible nature is transmitted to the drive chain 92 by any conventional means such as, for example, a shaft such as that shown at 53 in FIG. 6 having a sprocket affixed to either extremity thereof. In this situation, the drive chains 92 would be passed around the sprockets and sufficient slack allowed in the chains 92 to permit them to be raised into load driving position despite their driving connections.

As illustrated best in FIG. 24, the rollers 90 may be used in conjunction with a transversely disposed chain system identical to that shown in FIG. 4 at either 50 or 70 for load movement in directions transverse to the direction of movement of the rollers. The roller drive chain 92, conveniently, can pass through the closed loop drive chain 51 or 71 as shown in FIG. 24, sufficient space being provided between the over and under segment of chain 51 or 71 to permit both the wheels 91 and the chain 51 or 71 to be raised alternately to the positions shown in phantom in FIG. 24 to engage the load.

While FIG. 13 illustrates only the longitudinal drive assembly taking the form of rollers 91 rather than endless chains, it will be readily appreciated by those skilled in the art that a similar driving mechanism could be utilized for the lateral movement assembly. Such a situation in all probability would dictate the utilization of three rows of rollers between the outside longitudinal rollers in a manner very similar to that shown in connection with FIGS. 4 and 5. The particular embodiment chosen in any given environment will depend, of course, upon the weight, undersurface characteristics and materials procurement problems encountered.

FIG. 14 illustrates in block-diagram form the control apparatus for an individual module such as that illustrated in FIGS. 4 and 5. The module drive control 101 is located preferably directly upon the particular module with which it is associated and contains such items as the motor starters, the valving solenoids and the like.

The module drive control is responsive to external signals, the sources of which are to be discussed in detail hereinafter, to perform the following functions when associated with a four-way type of module:

1. Check the current rotational position of the load support castors 44 and rotate them to a new position via cylinder 47 if necessary, such rotation being accomplished by the activation of a suitable solenoid within valving unit 102.
2. Activate, again via a suitable valving solenoid within unit 102, either the lateral lift cylinder 83 or the longitudinal lift cylinder 63 to bring the proper drive chains 51 or 71 into contact with the load on the castors.
3. Activate either longitudinal drive motor 54 or lateral drive motor 74 in the proper direction in order to commence either movement of a load from the particular module or acceptance of the load from an adjacent module.
4. Commence the braking action of the activated motor upon signal from one of the contained limit switches 107.

The fluid supply 103 is centralized preferably and a conduit run to each of the modules in order to provide pressurized air at the proper pressure. Pressure monitor valves 104 and 105 are operatively connected to longitudinal lift cylinder 63 and lateral lift cylinder 83, respectively, as a means of monitoring the pressure exerted upon the lower surface of the load during the movement operation. Alternatively, of course, mechanical adjustment means may be provided for adjusting the height to which the drive chains are lifted by the cylinders 63 and 83. Regardless of the particular method used, the drive mechanisms should come into abutment with the load with sufficient force to grasp it for movement and, yet, permit primary weight to remain borne by the castors.

Figure 15:
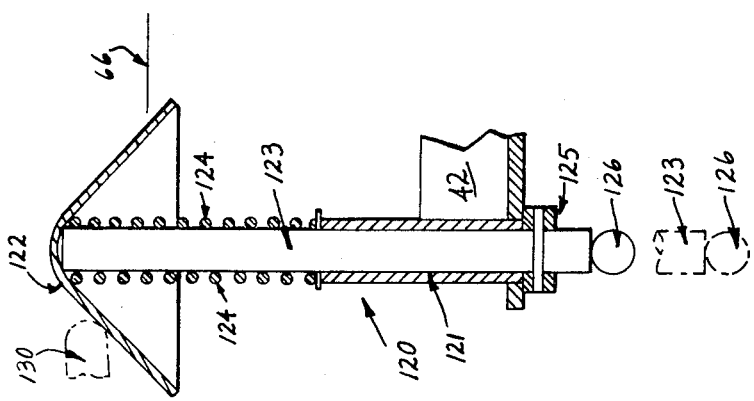
FIG. 15 is a fragmentary, side-elevational view, partially in cross section, of a limit switch activating mechanism suitable for utilization within the system.

Signals are received by the module drive control unit 101 from the computer interface equipment 110, the limit switches 107 positioned on the associated module and the limit switches 106 positioned on adjacent modules. A typical limit switch 120 is shown in FIG. 15. It comprises an upstanding sleeve 121 suitably secured to the bed or frame 42 by means such as welding or the like. Slidably positioned within sleeve 121 is an elongated shaft 123 having a cone-shaped cap 122. Between the lower surface of cap 122 and the upper rim of sleeve 121 is placed a compression spring 124 and a suitable retaining collar 125 is provided affixed to the shaft below sleeve 121. Positioned below the lower extremity of shaft 123 is the throw 126 of a suitable switch.

The reference numeral 66 in FIG. 15 represents the supporting surface of the module—i.e., the plane of the support castor surfaces—and the reference numeral 130 represents a bumper or the like on a pallet or other type of load. As the pallet slides across the module, the bumper 130 strikes the cone-shaped cup 122 forcing it downwardly because of the sloped surface thereof. This in turn forces shaft 123 to the position shown in phantom in FIG. 15 which depression, in turn, manipulates the throw 126 on a suitable switch as will be readily apparent to those skilled in the art. After the load has passed over the surface of the particular module in question, compression spring 124 forces shaft 123 upwardly to the position shown in solid in the figure, thus releasing the swtich throw 126. While FIG. 15 illustrates a bumper 130 on the particular pallet in question, it will be readily appreciated by those skilled in the art that suitable results can be achieved also by merely allowing the edge of the pallet or article which is generally flush with plane 66 to strike the actuating cap 122.

Figure 17:
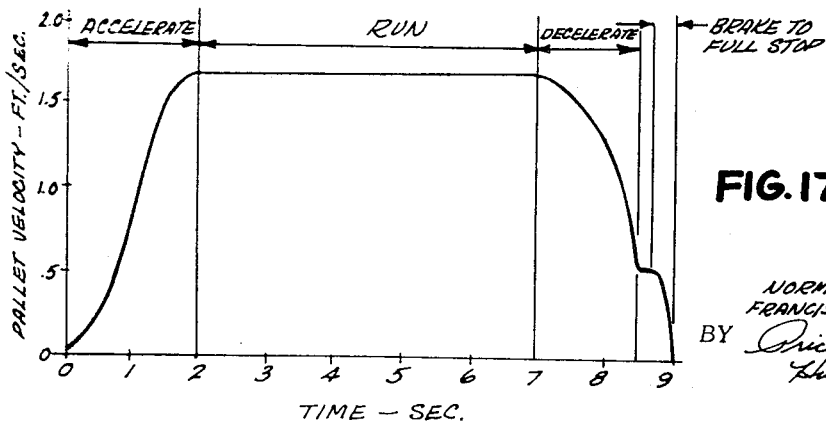
FIG. 17 is a graphical representation of the velocity of a load during its transfer from one module to an adjacent module.

As will be discussed in greater detail hereinafter, the individual pallets or loads are transferred from module to module within the system in a start-stop fashion. That is to say that the load is accelerated from a standing position on a first pallet to transfer it to a second adjacent pallet and, upon reaching the second pallet, the load is decelerated and brought to a stop. Subsequent transfers are made in identical fashion according to the preferred embodiment of this invention. FIG. 16 illustrates a representative load move from module 40-A to module 40-B, the figure being provided primarily to indicate representative limit switch placement for motor control. Assume, thus, that a signal has been emitted by the central control system commanding that the load on module 40-A be transferred to adjacent module 40-B. Subsequent to proper castor orientation of the two modules, raising of the proper drive chains on both modules into load abutting position and the starting of the motors on modules 40-A and 40-B in the proper direction, the load is accelerated from module 40-A as indicated in FIG. 17 by the velocity/time curve. The pallet or other load accelerates from module 40-A reaching its running speed within a matter of two or three seconds. The transfer is continued between the modules and the load is gripped and driven by the driving mechanism on module 40-B as it leaves or passes out of contact with the driving mechanism on module 40-A.

As a means of decelerating the load, two limit switches such as shown in FIG. 15 may be provided on the downstream side of the acceptor module 40B. One of these limit switches, 120-C, will be depressed by the pallet slightly prior to its having reached its final desired position on accepter module 40-B. Assuming that a two-speed motor is being utilized, the activation of switch 120-C may be utilized to shift the motor into its lower speed causing deceleration of the load. As the load decelerates, it comes into contact with and depresses limit switch 120-D which is positioned slightly further "downstream" on the acceptor module 40-B than switch 120-C. The contacting of limit switch 120-D by the load is utilized to terminate the power input into the motor at which time a self-contained brake is applied to bring the load to a full stop at the desired position.

As will be seen from an examination of FIG. 17, acceleration, transfer and deceleration to a complete stop of a particular load may be accomplished with relative ease within a period of approximately 10 seconds. Merely by way of example, it has been found that a 2-HP, 480-60-3 right angle gear head motor with a unibrake will provide a satisfactory power source for the individual module units, two such motors being provided on those modules which have four-way or perpendicular transfer capabilities.

It will be obvious from an examination of FIG. 16, that, depending upon the particular location of an individual module within the system, it may be necessary to provide as many as 8 limit switches arranged to be depressed when the pallet has reached its near-terminal position on the module. Such an arrangement is illustrated, for example, in FIG. 6, the numerals 120-C and 120-D being utilized to denote the decelerate and terminate switches in the same manner as in FIG. 16. Since the switches must be located ordinarily on the downstream side of the module, and since many of the modules must be capable of accepting a load from any of their four sides, this number of switches are necessitated. If, on the other hand, a particular module operates in only a uni-directional, bi-directional or tri-directional mode, the number of limit switches placed thereon may be reduced accordingly.

Figure 18:
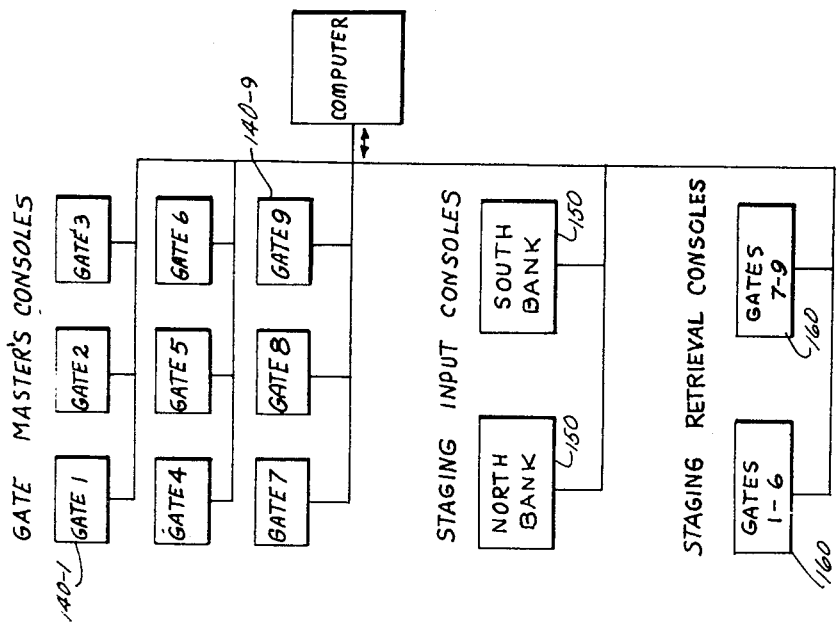
FIG. 18 is a block diagram of the console inputs to the control system.
Figure 19:
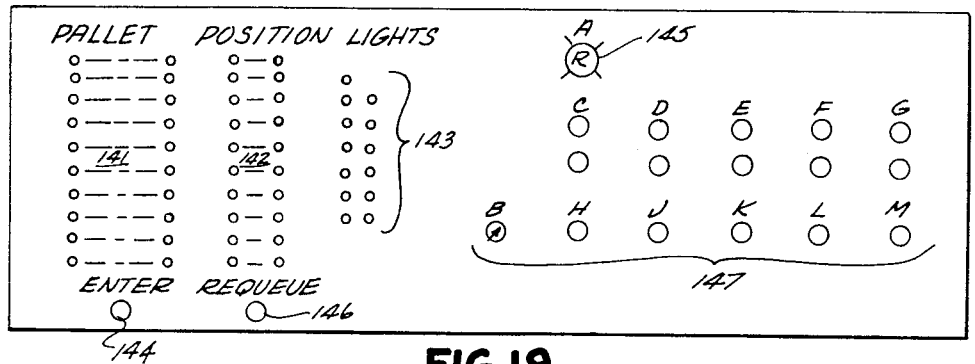
FIG. 19 is a schematic representation of a typical gate master's console.

The preferred embodiment of this invention contemplates a control system including a central computer such as, for example, the GE PAC 4000 with appropriate hardware and software. A typical control organization for a system such as that illustrated in FIGS. 1 and 2 is shown in FIGS. 18 through 22. Referring initially to FIG. 18, each of the gates 1 through 9 is equipped with a gate master's console 140. The consoles, preferably, are positioned closely adjacent both the input areas 21 and the aircraft unloading positions such that the gate master can supervise the loading and unloading operations as well as introduce and withdraw cargo from the system. A typical gate master's console is illustrated in FIG. 19 and comprises a series of pallet identification inputs 141, a series of pallet address inputs 142 and a series of queuing area status lights 143, one such light being utilized to indicate the state of each module within the associated queuing area. The console is provided, additionally, with an enter input 144, a light 145 for indicating the presence or absence of a load on the initial input module, a requeue input 146 and miscellaneous other inputs indicated generally by the reference numeral 147. The general purpose of the gate master's consoles is to provide a means whereby the gate master may dispatch freight loads in accordance with predetermined loading and unloading manifests. As a particular aircraft is unloaded, the gate master dispatches the freight to (1) an assigned queuing spot at his own gate for thru freight; (2) an assigned queuing spot at some other gate for an online transfer; or (3) to the staging area for storage or discharge dispatching by the staging input console operator.

As pallets are unloaded from the aircraft and placed onto the vertically shiftable modules, the gate master notes the pallet identification and compares it with the unloading manifest to determine where the pallet is to be sent. He then depresses the buttons or the like 141 to indicate the proper pallet identification and the buttons 142 to represent the desired pallet address. This information is entered into the computer by the pushing of the button 144 and the pallet introduced into the system at the proper moment by activation of one of the miscellaneous inputs 147.

The computer preferably is pre-programmed in such a manner that it may call from its memory bank virtually instantaneously a proper sequence of intra-system module transfers in order to convey a given pallet or other load from any input in the system to any other module on the upper level or, alternatively, to the staging input operator on the lower level. The program includes, preferably, alternate routing schemes as well as a preferred scheme in order to prevent clogging of the system caused by a "popular" module being in constant demand at any given time. Once, therefore, the pallet or other load has been introduced into the system by the gate master, it automatically moves to the predesignated position entered at the inputs 142, the computer keeping track of its instantaneous position and identification. This movement, as noted previously, is in stop-start fashion from module to module along the system and includes, when required, the transfer of a pallet or load onto a verticaly movable module for transfer from the upper to lower level, or from the aircraft still level to the upper level or the like.

The gate master's console is also fitted with the necessary buttons or the like for controlled loading of the aircraft from the particular gate queuing station. Normal operation will simply call for the simultaneous transfer of loads from each group of queuing stations onto the loading module in proper loading sequence, such transfer also being pre-programmed into the computer. Upon reaching a specified point such as the leveling dock module, the loads will stop until such time as they are manually released by the gate master via another one of the push buttons 147. The console should be fitted with override controls in the event that an emergency requires the withdrawal of any specific load from a specific queuing station to requeue its loading sequence. Such an override control is indicated at 146, proper push buttons being provided within the group 147 to permit actual movement of the pallet after the computer has been "locked out." The gate master's console 140 should include, additionally, push button means or the like for adjusting the leveling docks 131 to the sill height of the plane, the receiving station 148 along therewith and the lift station 149 (see gates 9 and 1 in FIG. 1).

Figure 20:
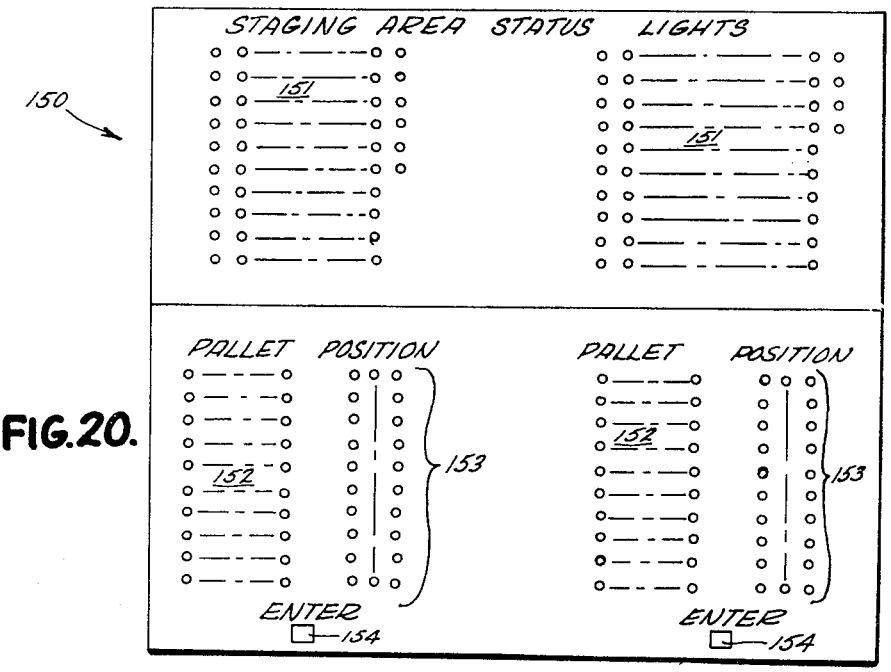
FIG. 20 is a schematic representation of a typical staging input console.

The staging input consoles 150 are located on the lower level in the illustrative embodiment shown in FIGS. 1 and 2. The purpose of these consoles is to permit the dispatch to storage on an assigned staging module, all freight coming into the staging area. In the embodiment illustrated, this includes freight transferred from the gate master's consoles via the vertical lifts 15. Depending upon the size of the installation, two such consoles may be required to permit operation by two operators. Conveniently, however, the consoles (one for the north side of the staging area and one for the south side of the staging area in the embodiment illustrated) may be incorporated into a single bank in order to permit operation by a single person during slack periods. A typical staging input console is illustrated in FIG. 20 and includes a series of staging area status lights 151 which indicate, of course, the empty or committed status of each module in the staging area; a plurality of pallet identification inputs 152 and a plurality of pallet address inputs 153. The pallet identification codes may be read, for example, by means of closed circuit television cameras and the read-out displayed to the staging input console operator.

As each pallet which has come into the staging area passes by one of the cameras, its identification is read, placed into the system through proper manipulation of the inputs 152 and its assigned address, which may be either any of the non-committed staging modules or a specific, predetermined queuing module, keyed into the system by manipulation of the inputs 153. As soon as this procedure is completed, the enter button 154 is activated, causing the information at the inputs 152 and 153 to be placed into the computer memory bank, the light 151 corresponding to the particular assigned module to flash to "committed" status and the pallet to proceed under a predetermined computer program identical to that discussed above toward its assigned storage module.

Figure 21:
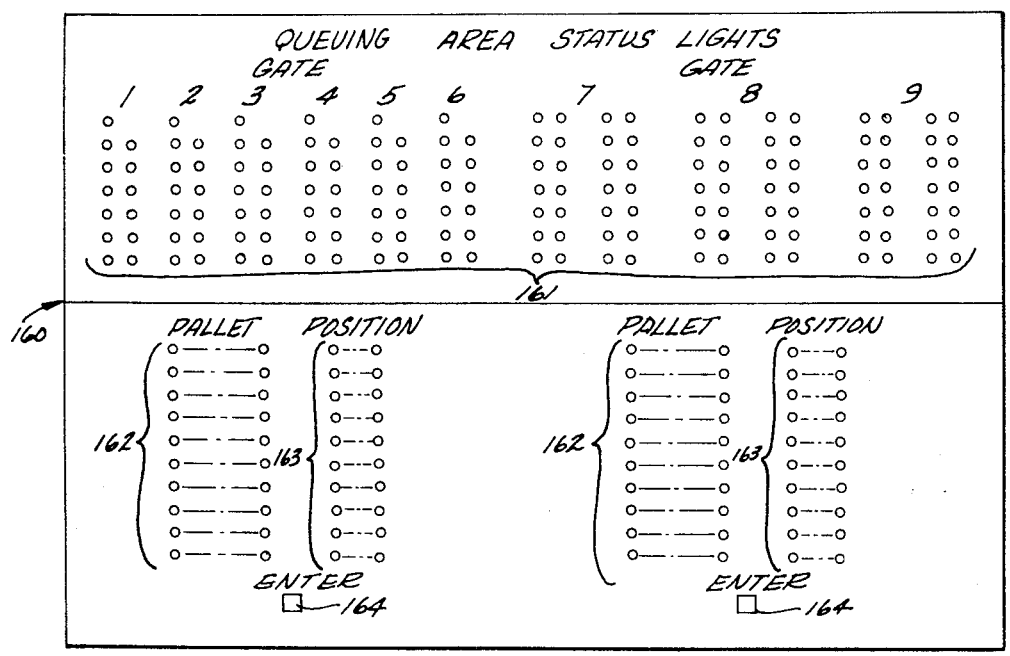
FIG. 21 is a schematic representation of a typical staging retrieval console.

In addition to the gate master's consoles and the staging input console, inputs are also fed to the computer from the staging retrieval consoles 160, a representative embodiment of which is illustrated in FIG. 21. The general purpose of the staging retrieval console is to enable the operator thereof to retrieve specific freight loads from their staged storage position and to dispatch them to a predetermined queuing spot at a predetermined gate or, perhaps, to retrieve specific freight loads and dispatch them to the terminal or breakdown area. Two such consoles, again confined to a single operating area to permit operation by a single operator during slack periods, are provided for peak period operation, one of the consoles, for example, being associated with gates 1 through 6 and the other with gates 7 through 9. As illustrated in FIG. 21, a typical console 160 for this purpose should contain a series of queuing area status lights 161, one for each module in the queuing area of each gate; a pallet identification input 162 and a pallet destination input 163.

When the time has arrived to transfer the freight pallets from the staging area to the queuing area at a particular gate, the operator will introduce into the system via the inputs 162 and 163 the identification of each of the pallets and the particular queuing module to which it is assigned. When all of the loads for a particular aircraft have been placed into buffer storage, the operator will push the enter button 164, causing the entire information to enter into the main memory bank. The computer which has retained track of the staging area address of each of the pallets, will thereafter initiate pre-programmed movement of the pallets in stop-go fashion through the staging area, onto the proper hoist, up to the upper level and, thereafter, onto the particular queuing module to which the load has been assigned.

FIG. 22 illustrates in block-diagram form the interconnection between typical control elements for the system. These elements include the computer 170 feeding commands out via a multiple output control 172 to a set of latch contacts 173 and a set of momentary contacts 174. The latched contacts control the status lights at the gate master, staging input and staging retrieval consoles. The momentary contacts, of course, emit instruction signals to the module drive controls 101 which thereafter latch into the directed operating condition until a transfer between modules has been completed. Instructions, program and the like are fed into the computer via an input/output device 171 and a digital input control 177. The digital input control 177 is tied to the various consoles and limit switches throughout the system by means of an input termination device 176 as will be readily understood by those skilled in the art.

In this regard, it should be noted that each of the vertically shiftable modules must be equipped with vertical position sensing limit switches in order to notify the computer of their current status. These switches are in addition, of course, to the limit switches located on the module itself which is carried by the particular lift in question. Thus, for example, a limit switch must be provided to notify the computer when lift 15-1 is in horizontal registry with the adjacent stationary modules such that loads will be transferred onto the shiftable modules 15-1 only at this time. Similarly, the computer must be notified when the lift carrying modules 15-1 is in horizontal registry with adjacent modules at the lower level staging area to prevent pallets from being ejected from the lifts prematurely. These elevator limit switches, indicated generally by the reference numeral 175 in FIG. 22, feed to the computer via the digital input control 177 along with the module limit switches and the various consoles throughout the system.

The preferred embodiment of the invention includes, additionally, an alarm channel 178, the purpose of which is to notify the system personnel of an incomplete and/or incorrect module-to-module transfer within the system. More particularly, the alarm channel functions to sense the initiation of the movement of a pallet from one module to another and the receival of that pallet by the adjacent module. The alarm channel counts the elapsed time between initiation of the donation step and completion of the acceptance step and, in the event this time period exceeds a predetermined limit, sounds an alarm spelling out on the input/output device the particular modules involved. The alarm channel 178 may be used additionally to detect double commitments of the various queuing and staging modules to further insure proper operation of the system.

FIG. 23 illustrates in somewhat expanded fashion, a series of 11 modules located within and adjacent gate 8 in FIG. 1, each of the modules being designated by the reference numerals 40-1 through 40-11 in FIG. 23 and 1-11 in FIG. 1. In FIG. 23, modules 40-1, 40-4 and 40-7 form a segment of lane 16-A of the main conveyor 16; modules 40-2, 40-5 and 40-8 a segment of lane 16-B of main conveyor 16; and modules 40-3, 40-6 and 40-9 a segment of lane 16-C of main conveyor 16. Module 40-10 represents the initial transfer module of spur conveyor 13-8 and module 40-11 represents both an initial spur transfer module and the initial queuing module 14-8 associated with gate 8. On each of the modules shown in FIG. 23, the letters A, B, C and D represent representative limit switch positions, the limit switches preferably corresponding to that designated by the reference numeral 120 in FIG. 15. Depending upon the particular drive motors utilized, each of these letters may represent, additionally, a series of two such limit switches 120, one being utilized for deceleration and the other for power interruption and braking in the manner discussed in connection with FIGS. 16 and 17 and as illustrated in FIG. 6.

Assume that a pallet has been positioned on module 40-4 via a transfer procedure from an adjacent pallet identical to that to be described, and it is dictated by the computer program that the shortest route to the eventual destination requires passage over module 40-5. The initial step in the transfer procedure is the arming of one of the limit switches on module 40-5 by the computer as a means of ascertaining if module 5 is currently occupied. If such proves to be the case, the move from module 40-4 to module 40-5 is delayed or, alternatively, the move to the eventual destination is rerouted according to the computer program in order to arrive at the eventual destination without the necessity of passing over module 40-5. The instant transfer system as illustrated in the preferred embodiment of this invention requires, therefore, that the acceptor module, in this case module 40-5, be empty prior to initiation of a transfer thereonto. The modules 40, thus, operate in pairs during any transfer procedure, one operating to move the load off itself and the adjacent module operating to receive the load. The pairing of the modules and, thus, the rotating of the load through the system is dictated by the computer program.

In the event that limit switch 5-C, when armed by the computer, indicates that module 40-5 is empty, directional pulses are transmitted to the module drive controls 101 associated with each of modules 40-4 and 40-5. These directional pulses cause the module drive controls 101 to latch on resulting in, in sequence, (1) the rotation of the supporting castors 40-4 via cylinder 47 to proper directional position; (2) the raising of the longitudinal drive chains in a manner discussed previously of each of the modules 40-4 and 40-5 via the activation of longitudinal lift cylinder 63; and (3) the activation of the longitudinal drive motors 54 in the proper direction in order to transfer the load across the module to the right as viewed in FIG. 23.

As the pallet or other load is gripped by the pads 57 on driving chain 51 of module 40-4, it accelerates in the manner illustrated in FIG. 17, attains a predetermined speed and is passed from doner module 40-4 onto acceptor module 40-5 where its movement is continued by the gripping engagement of the longitudinal drive chains of the acceptor module.

During this interval, limit switch 5-C has again been armed or alternatively has remained armed since initially sensing the no-load condition of module 40-5 at the initiation of the transfer step. As the pallet passes onto module 40-5, it strikes initially the braking or deceleration portion of limit switch 5-C causing the load to be decelerated, in the preferred embodiment, the shifting of the drive motor associated with module 40-5 into a lower speed. As the pallet decelerates, it contacts finally the power termination limit switch 5-C braking the motor and load to a halt with the pallet properly centered on module 40-5. Simultaneously, a signal is emitted from limit switch 5-C causing module drive control 40-4 to unlatch and, thus, deactivate. At termination of the transfer cycle, therefore, all of the chains have returned to their lowered position and the pallet is ready to be transferred to module 40-6, thence to module 40-10 and thereafter to module 40-11 for queuing storage as soon as these modules become available, if they are not already so.

At the initiation of the transfer between modules 40-4 and 40-5, the timing circuit within alarm channel 178 is activated and begins counting. In the event the alarm channel has not received a signal from limit switch 40-5C indicating arrival of the pallet on that module within a predetermined time, an alarm will be sounded in the manner to be discussed previously to notify the operating personnel of the apparent malfunction in the system and its location. It has been found, for example, that the move can be completed with relative ease in a period of nine seconds with a one-second rest permitted prior to initiation of a succeeding move toward the final pallet destination.

The control system must include, as will be readily apparent to those skilled in the art, some mechanism for preventing an attempted simultaneous transfer of two pallets onto an adjacent module. As discussed to this point, for example, it would be possible for modules 40-4 and 40-6 in FIG. 23 to both attempt simultaneously to transfer their particular loads onto pallet 40-5, resulting in all probability in a shutdown of the three modules since the pallets would be resting on all of the critical limit switches. According to the preferred embodiment of this invention, this possibility is eliminated by providing an adjacent module interlock 179 (see FIG. 22) which interlocks all of the module drive controls 101 of the modules 40 in the system. Interlock 179 may function, for example, by preventing activation of the module drive controls 101 of any two adjacent modules unless a specific override signal has been emitted from the momentary contacts 174 associated with computer 170. The computer program in this situation would contain a checking step whereby the computer would check to ascertain if any of the adjacent modules were in the process of transferring a load onto an acceptor module prior to overriding the adjacent module interlock device and permitting the transfer in question. If, during this check, the computer ascertains that a transfer is in fact currently being executed onto the proposed acceptor module, the move will be delayed until such time as the computer receives an indication that (1) the proposed acceptor module is currently unoccupied; and (2) no transfer onto the proposed acceptor module is currently in progress. Then and only then will the contemplated move be permitted to be executed.

The hardware utilized in the implementation of the instant system including the control devices, modules and the like permits additions or other changes to an installed system as well as movement of the entire system to a new location. This flexibility, along with the multi-level possibilities of an installation, provides a means whereby a system of desired capability may be designed using generally standardized components for use in crowded or otherwise specialized areas. It might well be desirable, for example, to have a 4 or 5 level installation as opposed to the 2 level installation illustrated. In certain environments, it may be desirable on the other hand to limit the system to a single level. Any of these objectives may be easily accomplished through utilization of the concepts of the instant invention.

From an examination of this specification and the accompanying figures, it will be readily apparent that this invention has provided a novel as well as extremely useful contribution to the art of material handling. There is illustrated, in addition to the overall concept, specific mechanical and electrical arrangements capable of executing the various steps dictated by the concept. It will be readily appreciated by those skilled in the art that many departures, both electrical and mechanical, may be made from the physical and schematic structures and circuits illustrated without departing from the basic concepts of the invention. The embodiments which are the result of such departures are to be deemed included within the scope of the following claims unless these claims, by their language, expressly state otherwise.

The embodiments of the invention in which an exclusive property or privilege is claimed are defined as follows.

1. A method of conveying articles from one location to another over a series of modular conveyor units having self-contained load driving means, said method comprising the steps of:
   1. positioning said article in stationary position on a first of said units;
   2. determining the preferred unit adjacent to said first unit onto which it is desired to transfer said article in order to effect routing of said article to said other location;

3. sensing the status of the preferred unit to determine if it is currently occupied by another article, and if not;
4. activating said first unit and said preferred unit to cause said article to be transferred therebetween;
5. deactivating said first and said preferred units when the transfer has been completed to bring said article to a rest on said preferred unit; and
6. repeating steps 2 through 5 herein repeatedly to transfer said article over a succession of preferred modules until said other location has been reached by said article.

2. The method as set forth in claim 1 which further comprises, in the event said preferred module is occupied by another article, the step of determining an alternate preferred unit adjacent to said first unit onto which said article may be transferred and, yet, still be routed to said other location and thereafter transferring said article thereonto in the manner set forth in steps 3 through 5 and, thence, on to said other location via an alternate route.

* * * * *